July 21, 1964 G. M. J. SAROFEEN Re. 25,620

POLISHING SYNTHETIC RESIN LENSES

Original Filed June 20, 1960

INVENTOR

GEORGE M. J. SAROFEEN

BY Cushman, Darby + Cushman

ATTORNEYS

United States Patent Office

Re. 25,620
Reissued July 21, 1964

25,620
POLISHING SYNTHETIC RESIN LENSES

George M. J. Sarofeen, Colonial Heights, Va., assignor to Titmus Optical Company, Inc., Petersburg, Va., a corporation of Virginia Original No. 3,077,707, dated Feb. 19, 1963, Ser. No. 37,277, June 20, 1960. Application for reissue July 8, 1963, Ser. No. 295,280
23 Claims. (Cl. 51—284)

Matter enclosed in heavy brackets [ ] appears in the original patent but forms no part of this reissue specification; matter printed in italics indicates the additions made by reissue.

The present invention relates to the polishing of synthetic resin lenses.

It is an object of the present invention to develop an improved procedure for polishing synthetic resin lenses.

Another object is to develop an improved composition suitable for polishing synthetic resin lenses.

A further object is to eliminate the problem of the hydration of stannic oxide when it is employed to polish lenses.

Yet another object is to eliminate the scratching which occurs when tin oxide is employed to aid in the polishing of synthetic resin lenses.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
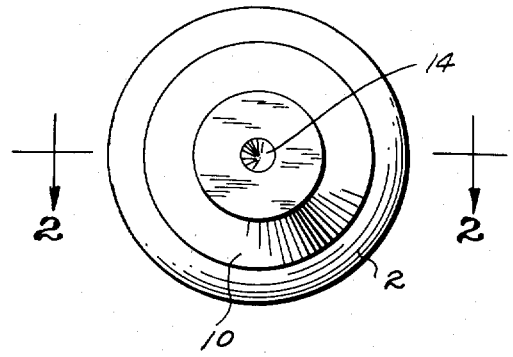
FIGURE 1 is a front elevation of the finishing or grinding machine.
Figure 2:
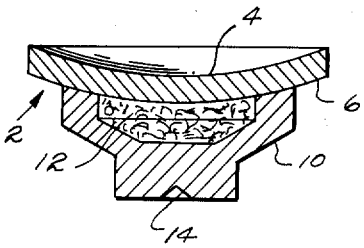
FIGURE 2 is a section taken along the line 2—2 in FIGURE 1.
Figure 3:
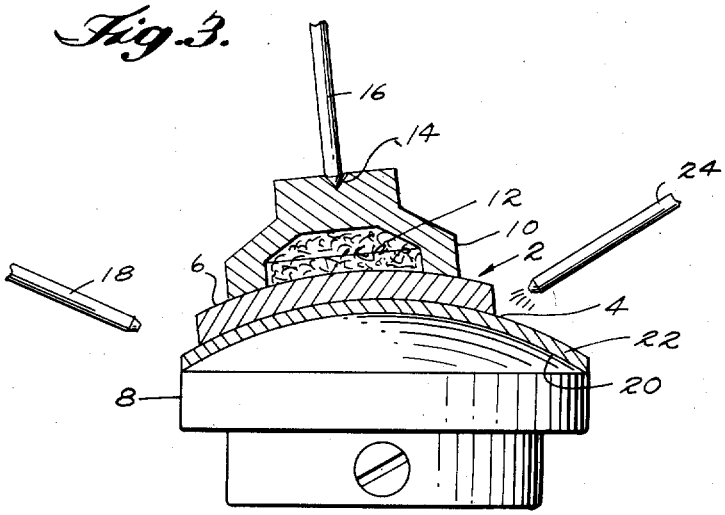
FIGURE 3 is a cross sectional view of the grinding machine modified for the polishing operation.

Referring more specifically to the drawings, there is provided a plastic lens blank 2 of generally spherical curvature. The front, inner face has a concave surface 4 and the rear, outer face a convex surface 6. The lens blank 2 is positioned upon cast iron grinding block 8 which has the mating configuration for that desired for the concave surface 4.

The lens blank 2 is prepared for grinding by cementing to the rear face 4 a block 10 by means of pitch or other adhesive 12. Block 10 has a conical center socket 14 aligned with the axis of the lens blank. There is also provided a centering spindle 16 having a pointed tip adapted to fit in socket 14. To grind the face of blank 2, the grinding block 8 is rotated about its own operating axis with blank 2 held against the upper surface of the block 8. Grinding compound such as emery, garnet or stannic oxide is supplied through tube 18.

The apparatus just described is that conventionally employed in the finishing operation. In order to perform the polishing operation, the same type of apparatus is employed with the following modification. To the top surface 20 of the grinding block 8 there is adhered a polishing pad 22, e.g., of felt or preferably of cotton velveteen. This pad must not be too soft or too hard. It should also have a proper backing so that it won't stretch or wrinkle. The backing portion of the pad can be of saran, cellulose ester or other plastic and is united to the block 8 by any appropriate adhesive.

In the polishing operation the abrasive employed is not emery or the like but is powdered stannic oxide with or without an ameliorating material such as powdered titanium dioxide, zirconia, chromic oxide, ferric oxide or magnesia. The ameliorating material prevents the stannic oxide from scratching while the stannic oxide in turn performs the cutting operation. In preferred operation, a mixture of equal parts of stannic oxide and titanium dioxide having a particle size of under 44 microns is used. The amount of ameliorating material can be from 0 to 70% of the total of stannic oxide and ameliorating material.

It is critical in polishing plastic lenses that the cutting be done while the cutting materials are supported yieldingly. It has also been found critical according to the invention that there be supplied a viscous material to hold the abrasive in contact with the lens surface while at the same time not making it immovable. Accordingly, in addition to supplying the abrasive through tube 18, there is also supplied to the velveteen pad 22 a viscous material such as glycerine through tube 24. While the abrasive and viscous material can be added through a single tube, better control of conditions on the pad 22 can be obtained by employing separate supply tubes.

In the above operation the glycerine functions as a viscous material but not as a complete lubricant since it permits some frictional action. In place of glycerine there can be employed other inert viscous liquids including polyhydric alcohols such as liquid polyglycols, e.g., diethylene glycol, dipropylene glycol and triethylene glycol, sorbitol, aqueous methyl cellulose solution, aqueous polyvinyl alcohol solution, etc. The glycerine or the like is employed in amount to mix the powders (stannic oxide with or without ameliorating material) into a viscous mix.

The pile in the velveteen supports a homogeneous mass of polishing material which in the aggregate comprises a yieldable surfacing medium. The pile is in constant motion throughout the polishing operation.

It has also been found that the addition of a small amount of dioctyl phthalate to the viscous material controls the particles which break off the surface or edge of the lens from scratching. Preferably, about 10 ml. of dioctyl phthalate are employed per 2000 ml. of viscous mix. The addition of methyl salicylate, preferably in an amount of 10 ml. per 2000 ml. of viscous mix, aids in keeping the pad open and at the same time eliminates the problems of hydration of the stannic oxide.

The plastic lens is preferably made of a terpolymer of (1) an ester of a glycol with an acid ester of a monohydric alcohol containing at least one aliphatically unsaturated carbon to carbon double bond and carbonic acid in which both hydroxy groups of the glycol are esterified with the acid ester in an amount of 78–98%, (2) a diester of a monohydric alcohol containing at least one aliphatically unsaturated carbon to carbon double bond with a phthalic acid in an amount of 1–20%, and (3) a dialkyl ester of an alkenedioic acid in an amount of 0.25–10%. The most preferred plastic is the terpolymer of 100 parts diethylene glycol di (allyl carbonate), 4 parts of diallyl ortho phthalate and 2 parts of dibutyl maleate.

To make the terpolymer, typical glycol esters are ethylene glycol di (allyl carbonate), diethylene glycol di (allyl carbonate), propylene glycol di (allyl carbonate), tetraethylene glycol di (allyl carbonate), dipropylene glycol di (allyl carbonate), diethylene glycol di (methallyl carbonate), diethylene glycol allyl carbonate methallyl carbonate, ethylene glycol di (vinyl carbonate), triethylene glycol di (methallyl carbonate), diethylene glycol di (2-chlorallyl carbonate), diethylene glycol di (propargyl carbonate), diethylene glycol di (butadienyl carbonate), diethylene glycol di (cinnamyl carbonate) and diethylene glycol di (phenylpropargyl carbonate).

As the phthalate esters for use in making the terpolymer there can be employed divinyl o-phthalate, diallyl o-phthalate, dimethallyl o-phthalate, allyl methallyl o-phthalate, dicrotyl o-phthalate, dioleyl o-phthalate, dipropargyl o-phthalate, dibutadienyl o-phthalate, di 2-chlorallyl o-phthalate, dicinnamyl o-phthalate, diallyl isophthalate, dicrotyl isophthalate, diallyl terephthalate, dimethallyl terephthalate, didecenyl terephthalate and dimethallyl isophthalate.

As the dialkyl ester for making the terpolymer there can be used dimethyl maleate, diethyl maleate, dipropyl maleate, dibutyl maleate, propyl butyl maleate, di 2-ethylhexyl maleate, diamyl maleate, dihexyl maleate, dioctyl maleate, dioctadecyl maleate, dimethyl fumarate, diethyl fumarate, [dibuty] *dibutyl* fumarate, dioctyl fumarate, di secondary butyl maleate, diisooctyl maleate, dibutyl itaconate and dibutyl citraconate.

The above terpolymers which are the preferred plastic lens material used in the present invention can be prepared according to the process described in my copending application Serial Serial No. 22,025, filed April 13, 1960, and entitled "Polymers" now Patent No. 2,964,501. The entire disclosure of my copending application is hereby incorporated by reference.

The procedure of the present invention is also suitable for polishing lenses made from other plastic materials such as polymerized methyl methacrylate, polymerized diethylene glycol di (allyl carbonate), polymerized methyl α-chloracrylate, polymerized diallyl phthalate, polymerized ethylene glycol dimethacrylate, polymerized diallyl and phenylphosphonate.

I claim:

1. A composition suitable for polishing synthetic resin lenses comprising [grinding compound] *stannic oxide* and an inert viscous liquid having a viscosity substantially greater than water comprising a polyhydric alcohol.

2. A composition according to claim 1 wherein the viscous liquid is a polyhydric alcohol [and wherein the grinding compound is stannic acid].

3. A composition according to claim 2 including an inorganic metal oxide selected from the group consisting of titanium dioxide, zirconium dioxide, chromic oxide, ferric oxide and magnesium oxide as an ameliorating agent for the stannic oxide.

4. A composition according to claim 3 wherein the inorganic oxide is titanium dioxide.

5. A composition according to claim 4 also including dioctyl phthalate and methyl salicylate.

6. A composition according to claim 1 also including methyl salicylate.

7. A composition according to claim 1 also including dioctyl phthalate.

8. A composition according to claim 1 wherein the inert viscous liquid is an aqueous solution of polyvinyl alcohol.

[9. The composition of claim 1, wherein the grinding compound is selected from the group consisting of emery, garnet and stannic oxide.]

10. A method of polishing an optical surface made of a synthetic resin comprising supporting a homogeneous mass including [a] *stannic oxide as the* cutting agent and an inert viscous liquid material on a solid yieldable surfacing medium and contacting said optical surface with said solid yieldable surfacing medium supporting said homogeneous mass, said material having a viscosity substantially greater than water and comprising a polyhydric alcohol.

11. A method according to claim 10 wherein [the cutting agent is stannic oxide and] there is present in the homogeneous mass an inorganic metal oxide selected from the group consisting of titanium dioxide, zirconium dioxide, chromic oxide, ferric oxide and magnesium oxide as an ameliorating agent for the stannic oxide.

12. A method according to claim 10 wherein the homogeneous mass includes dioctyl phthalate to prevent scratching and methyl salicylate to keep the yieldable surfacing medium open.

13. A method according to claim 10 including dioctyl phthalate in the homogeneous mass.

14. A method according to claim 10 including methyl salicylate in the homogeneous mass.

15. A method according to claim 10 wherein the synthetic resin is a terpolymer of diethylene glycol di (allyl carbonate), diallyl o-phthalate and dibutyl maleate.

16. A method according to claim 10 wherein the viscous material is a methyl cellulose solution.

17. A method according to claim 10 wherein the inert viscous liquid is selected from the group consisting of liquid polyglycols, glycerine, sorbitol, aqueous solution of polyvinyl alcohol and aqueous solution of methyl cellulose.

18. A method according to claim 10 wherein the viscous liquid material is an aqueous solution of polyvinyl alcohol.

[19. The method of claim 10, wherein the grinding compound is selected from the group consisting of emery, garnet and stannic oxide.]

20. A method of polishing an optical surface made of a synthetic resin comprising applying a homogeneous mass *to a pile fabric, said homogeneous mass* including stannic oxide powder as the cutting agent, up to 70% based on the total weight of stannic oxide [, an ameliorating agent] of a powdered ameliorating agent selected from the group consisting of titanium dioxide, zirconium dioxide, chromic oxide, ferric oxide and magnesium oxide, and a viscous liquid polyhydric alcohol to hold the stannic oxide in contact with the optical surface [to a pile fabric], contacting said pile fabric with said optical surface and constantly moving said pile fabric to provide a yieldable surfacing medium while said contact with the optical surface is maintained.

21. A method according to claim 20 also including dioctyl phthalate and methyl salicylate in the homogeneous mass.

22. A method according to claim 20 wherein the polyhydric alcohol is glycerine.

23. A method according to claim 20 wherein the polyhydric alcohol is diethylene glycol.

24. A method according to claim 20 wherein the pile fabric is cotton velveteen pile fabric.

25. A method of polishing an optical surface made of a synthetic resin comprising supporting a homogeneous mass including stannic oxide as the cutting agent and a liquid polyhydric alcohol on a solid yieldable surfacing medium and contacting said optical surface with said solid yieldable surfacing medium supporting said homogeneous mass.

References Cited in the file of this patent or the original patent

UNITED STATES PATENTS

| | | |
|---|---|---|
| 2,437,436 | Mullen | Mar. 9, 1948 |
| 2,450,433 | Leeman | Oct. 5, 1948 |
| 2,865,725 | Schroeder | Dec. 23, 1958 |
| 2,934,416 | Harris | Apr. 26, 1960 |
| 2,955,030 | Baldwin | Oct. 4, 1960 |
| 2,955,031 | Bliton | Oct. 4, 1960 |